L. F. Frazee.

Plow.

No. 112,913.   Patented Mar. 21, 1871.

UNITED STATES PATENT OFFICE.

LAWRENCE F. FRAZEE, OF JERSEY CITY, NEW JERSEY.

IMPROVEMENT IN PLOWS.

Specification forming part of Letters Patent No. 112,913, dated March 21, 1871.

*To all whom it may concern:*

Be it known that I, LAWRENCE F. FRAZEE, of Jersey City, in the county of Hudson and State of New Jersey, have invented a certain new and useful machine for cutting and pulverizing the soil for purposes of agriculture, and which machine is somewhat in the nature of a gang-plow; and I do hereby declare the following to be such a full, clear, and exact description of my machine as will enable any one skilled in the arts to which my invention appertains to make and use the same, reference being had to the annexed drawings, making part of this specification, in which—

Figure 1:
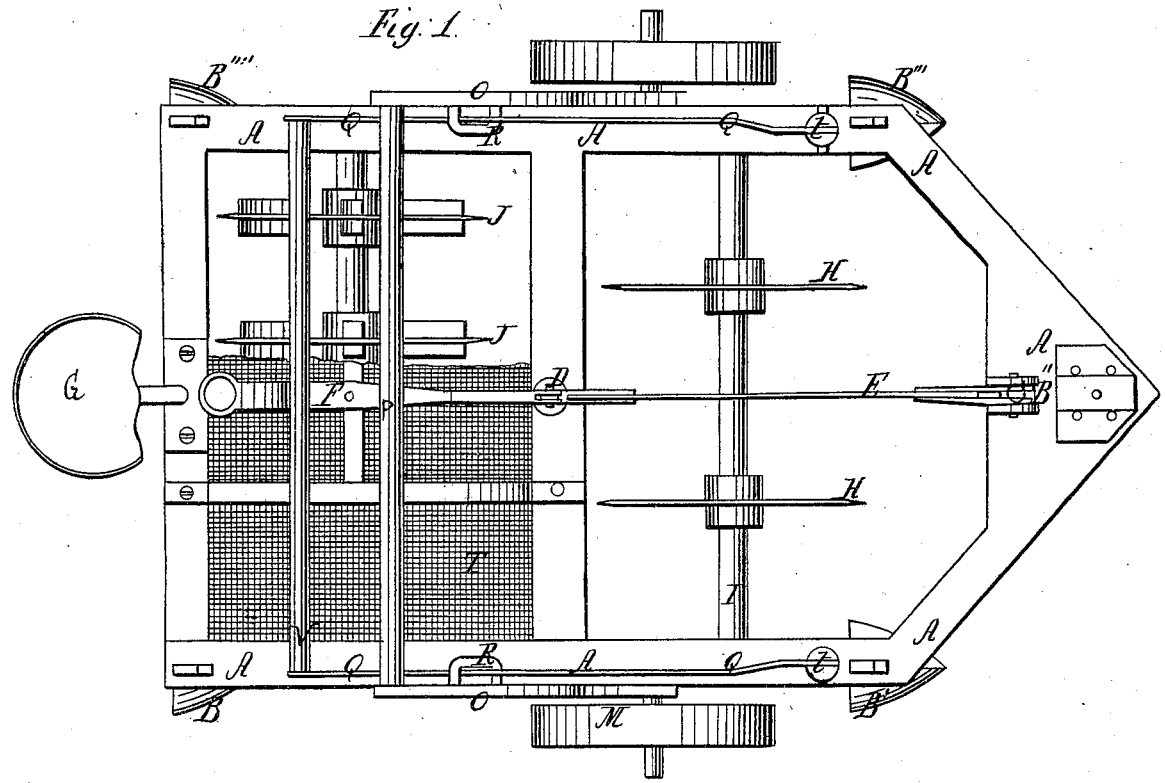
Figure 2:
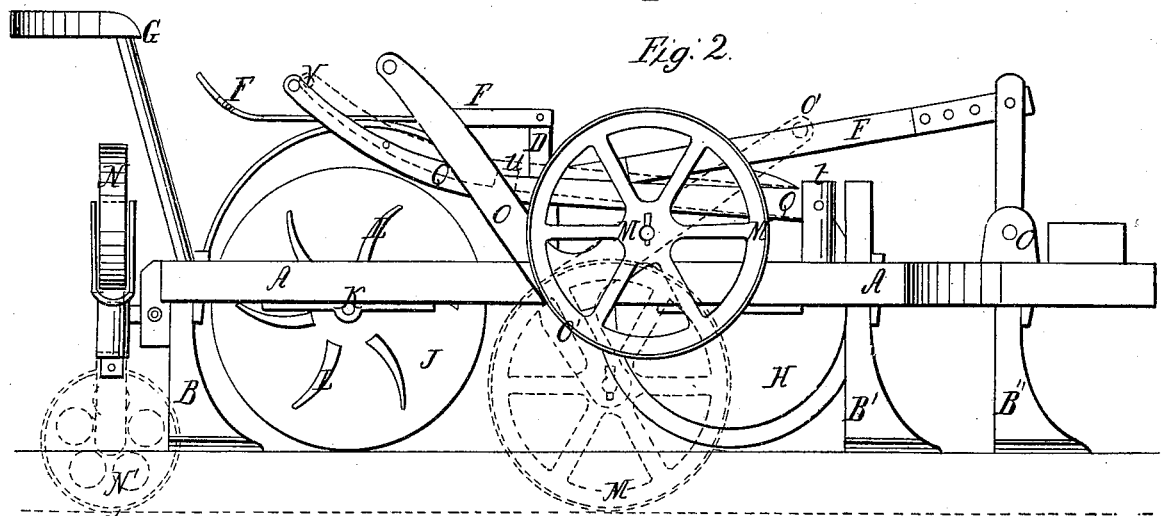

Figure 1 is a top view of said machine, and Fig. 2 a side elevation thereof.

Similar letters of reference represent corresponding parts of the two figures.

In the drawings, A represents the frame of the machine, consisting of timbers bolted together in the form substantially as shown. In this frame there are keyed or otherwise substantially fixed a series of five plows, as shown by B B' B'' B''' B'''', each of which has a broad double share fitted or cast on a vertical shank, the upper end whereof is keyed in the frame, as shown. The object of these plows is not to turn the soil, but rather to cut it loose and draw or hold the machine down while the diggers cut up and pulverize the ground. To accomplish this object readily, the shares of the plow and the front edge of the shank to which they are attached are made quite flat and thin, to enable them to pass easily through the ground. To govern the dip of these plows, the shank of the plow B'' is suspended on a pin in a bracket bolted to the frame, as shown by C, the upper end of the shank reaching up and connecting to a lever, D, by means of a connecting-rod, E, the upper end of the lever D being connected to the rod F, which is brought back to within reach of a driver on the seat at G. By these means the machine is made to work deep in the ground or merely skim the surface, or is thrown wholly out of the ground, as the case may require. By the arrangement of the plows B' B'' B''' the land is cut in strips of a given width, and by means of revolving colters H H these strips are divided in the center, making four narrow strips of land cut under the machine as it moves forward, the colters being in the form of disks keyed to a shaft, I, which is secured to the frame by means of brackets in such manner as to leave it free to turn about its own axis, in the manner shown. Now, to cut up and pulverize the ground there are four diggers, J J J J, fixed upon a shaft, K, which is hung in brackets bolted to the main frame across the rear part thereof, in the manner shown. These diggers consist of thin disks with sharp edges, and with curved flanges made upon each side, as shown by L. These flanges are made with sharp ends and as broad as may be desirable. The diggers are arranged upon the shaft so that their respective edges strike in the center of the strips which have been already cut by the plows, and the disks H H thus cutting the ground under the machine in eight strips instead of four, each strip being equal in width to the width of the digger-flange L, by which means the digger-flanges on each side of the disk upon which they are made cut up and pulverize one of the aforementioned strips of ground as the machine advances. The diggers are covered with perforated sheet-iron T to prevent accident. This completes a description of the operative parts of the machine, but in addition to these parts the machine is fitted with a pair of truck-wheels, M, and a caster-wheel, N, to facilitate its transportation. These truck-wheels are placed upon axles fixed in the short end of bell-cranks or levers O, the fulcrums of which are set in the sides of the main frame, and the long ends of which are united by means of a rod, P, reaching across the machine, and arranged within reach of the driver. By these means said wheels can be readily raised when the machine is put in operation to allow the plows to enter the ground or lowered when it may be desired to move the machine from place to place. The position of the lever and wheel when up is shown by M O, and when down it is represented in dotted lines M' O'. The pivot of the caster-wheel N is set in a socket bolted to the rear end of the frame, and so arranged as to enter the socket at the top or bottom, the wheel being set on the ground, as shown by N' in dotted lines, when the machine is to be transported, but when the machine is at work the wheel is carried in the position shown by N.

To facilitate the operation of the truck-wheels there is a lever, Q, hung on a pivot or pin at $t$ on each side of the main frame. These levers reach well back toward the rear end of the machine, where their ends are united by means of a rod, V, passing in front of the driver's seat. Each of these levers passes through a staple, R, arranged in the levers O, so that by raising the levers Q, the levers O are also raised. Now, to secure the last-mentioned levers in the desired position to keep the wheels on or off of the ground, there are notches $u$ made in the under side of the lever Q, which catch upon the bottom tine of the staples R, and hold it in the desired position.

Having now described the construction and operation of my machine, I claim as new herein and desire to secure by Letters Patent—

The diggers J, the colters H, and the plows B, arranged in relation to each other substantially as described.

LAWRENCE F. FRAZEE.

Witnesses:
 PETER D. KENNY,
 AMOS BROADNAX.